United States Patent
Steer et al.

(10) Patent No.: US 7,421,276 B2
(45) Date of Patent: Sep. 2, 2008

(54) METHOD, APPARATUS AND SYSTEM OF CONFIGURING A WIRELESS DEVICE BASED ON LOCATION

(75) Inventors: David Steer, Nepean (CA); Koon Hoo Teo, Nepaen (CA); Adrian David Smith, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 608 days.

(21) Appl. No.: 10/682,086

(22) Filed: Oct. 10, 2003

(65) Prior Publication Data

US 2004/0204026 A1   Oct. 14, 2004

Related U.S. Application Data

(60) Provisional application No. 60/461,344, filed on Apr. 9, 2003.

(51) Int. Cl.
*H04Q 7/20* (2006.01)

(52) U.S. Cl. .............. 455/456.1; 455/456.2; 455/404.2; 455/67.11; 455/423; 455/67.13; 370/462; 370/342; 709/230; 709/227

(58) Field of Classification Search .............. 455/404.2, 455/456.1, 456.2, 67.11, 67.13; 370/462, 370/342; 709/230, 227
See application file for complete search history.

(56) References Cited

U.S. PATENT DOCUMENTS

| | | | | |
|---|---|---|---|---|
| 5,905,943 | A * | 5/1999 | Wiedeman et al. | 455/11.1 |
| 5,930,248 | A * | 7/1999 | Langlet et al. | 370/347 |
| 6,125,260 | A * | 9/2000 | Wiedeman et al. | 455/11.1 |
| 6,148,219 | A * | 11/2000 | Engelbrecht et al. | 455/456.2 |
| 6,192,038 | B1 * | 2/2001 | Wallerius et al. | 370/328 |
| 6,363,254 | B1 * | 3/2002 | Jones et al. | 455/456.1 |
| 6,463,290 | B1 * | 10/2002 | Stilp et al. | 455/456.1 |
| 6,552,661 | B1 * | 4/2003 | Lastinger et al. | 340/572.1 |
| 6,650,902 | B1 * | 11/2003 | Richton | 455/456.3 |
| 6,775,552 | B2 * | 8/2004 | Link, II | 455/456.1 |
| 6,778,836 | B2 * | 8/2004 | Kawakami | 455/456.1 |
| 6,782,264 | B2 * | 8/2004 | Anderson | 455/456.1 |
| 6,892,059 | B1 * | 5/2005 | Kim et al. | 455/272 |
| 6,952,574 | B2 * | 10/2005 | Tealdi et al. | 455/404.2 |
| 6,958,677 | B1 * | 10/2005 | Carter | 340/10.1 |
| 6,983,147 | B1 * | 1/2006 | Hans et al. | 455/436 |

(Continued)

OTHER PUBLICATIONS

Ahson, Syed A.; Mahgoub, Imad; Research Issues in a Mobile Computing; IEEE, 1998, pp. 209-215.

(Continued)

*Primary Examiner*—Marceau Milord

(57) ABSTRACT

According to an aspect of the present invention one or more radio units of a wireless device are used to measure or detect clues about the radio propagation environment and type of space that surrounds a wireless device. From the measurements, the wireless device may determine the type of location that it is located within, whether that is simply a determination between inside and outside or a more complex determination of the type of building or space that the wireless device is located within. In either case, this determination can be used to automatically change/adjust the radio system operation parameters the wireless device operates in accordance with. With the type of location determined, a wireless device may then automatically select the appropriate radio system operation parameters for the type of location that it is in and the corresponding regulations that apply.

13 Claims, 4 Drawing Sheets

U.S. PATENT DOCUMENTS

| | | | |
|---|---|---|---|
| 7,039,017 B2* | 5/2006 | Sherlock | 370/252 |
| 7,043,273 B2* | 5/2006 | Sarresh et al. | 455/562.1 |
| 7,062,232 B2* | 6/2006 | Coan et al. | 455/101 |
| 7,117,022 B2* | 10/2006 | Kang | 455/574 |
| 7,145,893 B2* | 12/2006 | Lomp et al. | 370/342 |
| 7,146,134 B2* | 12/2006 | Moon et al. | 455/67.11 |
| 7,184,777 B2* | 2/2007 | Diener et al. | 455/456.1 |
| 2003/0050089 A1 | 3/2003 | Ogino et al. | 455/552 |

OTHER PUBLICATIONS

Kivinen, Jarmo; Zhao, Xiongwen; Vainikainen, Pertti; Wideband Indoor Radio Channel Measurements With Direction of Arrival Estimations in the 5 GHZ Band; IEEE, 1999, pp. 2308-2312.

Apostolopoulos, G.; Williams, D.; Kamat, S.; Guerin, R.; Orda, A.; Przygienda, T.; QoS Routing Mechanisms and OSPF Extensions; Networking Group, Request for Comments: 2676; Category: Experimental; Aug. 1999; pp. 1-50.

* cited by examiner

METHOD, APPARATUS AND SYSTEM OF CONFIGURING A WIRELESS DEVICE BASED ON LOCATION

PRIORITY CLAIM

This application claims the benefit of U.S. Provisional Application No. 60/461,344, filed Apr. 9, 2003, which is hereby incorporated by reference in its entirety.

CROSS REFERENCES TO RELATED APPLICATIONS

This application is related to the following Provisional patent applications filed in the U.S. Patent and Trademark Office, the disclosures of which are expressly incorporated herein by reference:

U.S. Patent Application Ser. No. 60/446,617 filed on Feb. 11, 2003 and entitled "System for Coordination of Multi Beam Transit Radio Links for a Distributed Wireless Access System"

U.S. Patent Application Ser. No. 60/446,618 filed on Feb. 11, 2003 and entitled "Rendezvous Coordination of Beamed Transit Radio Links for a Distributed Multi-Hop Wireless Access System"

U.S. Patent Application Ser. No. 60/446,619 filed on Feb. 11, 2003 and entitled "Distributed Multi-Beam Wireless System Capable of Node Discovery, Rediscovery and Interference Mitigation"

U.S. Patent Application Ser. No. 60/447,527 filed on Feb. 14, 2003 and entitled "Cylindrical Multibeam Planar Antenna Structure and Method of Fabrication"

U.S. Patent Application Ser. No. 60/447,643 filed on Feb. 14, 2003 and entitled "An Omni-Directional Antenna"

U.S. Patent Application Ser. No. 60/447,644 filed on Feb. 14, 2003 and entitled "Antenna Diversity"

U.S. Patent Application Ser. No. 60/447,645 filed on Feb. 14, 2003 and entitled "Wireless Antennas, Networks, Methods, Software, and Services"

U.S. Patent Application Ser. No. 60/447,646 filed on Feb. 14, 2003 and entitled "Wireless Communication"

U.S. Patent Application Ser. No. 60/451,897 filed on Mar. 4, 2003 and entitled "Offsetting Patch Antennas on an Omni-Directional Multi-Facetted Array to allow Space for an Interconnection Board"

U.S. Patent Application Ser. No. 60/453,011 filed on Mar. 7, 2003 and entitled "Method to Enhance Link Range in a Distributed Multi-hop Wireless Network using Self-Configurable Antenna"

U.S. Patent Application Ser. No. 60/453,840 filed on Mar. 11, 2003 and entitled "Operation and Control of a High Gain Phased Array Antenna in a Distributed Wireless Network"

U.S. Patent Application Ser. No. 60/454,715 filed on Mar. 15, 2003 and entitled "A Method to Efficiently Search for Neighbours using a Directive Antenna System in a Distributed Wireless Network"

U.S. Patent Application Ser. No. 60/461,579 filed on Apr. 9, 2003 and entitled "Minimisation of Radio Resource Usage in Multi-Hop Networks with Multiple Routings"

U.S. Patent Application Ser. No. 60/464,844 filed on Apr. 23, 2003 and entitled "Improving IP QoS though Host-Based Constrained Routing in Mobile Environments"

U.S. Patent Application Ser. No. 60/467,432 filed on May 2, 2003 and entitled "A Method for Path Discovery and Selection in Ad Hoc Wireless Networks"

U.S. Patent Application Ser. No. 60/468,456 filed on May 7, 2003 and entitled "A Method for the Self-Selection of Radio Frequency Channels to Reduce Co-Channel and Adjacent Channel Interference in a Wireless Distributed Network"

U.S. Patent Application Ser. No. 60/480,599 filed on Jun. 20, 2003 and entitled "Channel Selection"

1.Field of the Invention

This invention relates generally to wireless communications and, in particular, to methods of operating a wireless device.

1.Background

The traditional method of configuring a wireless network node is for it to be built for a specific type of location (e.g. indoor, outdoor, within a hospital, etc.) when it is manufactured, prior to installation. However, this has the disadvantage that various wireless network node types must be manufactured, stocked and shipped to a deployment site. The network installer (or planner) must also be careful to order the correct mix of wireless network node types for a particular installation. This is difficult in many deployment situations because the details of the deployment are not usually known until the time of the installation.

SUMMARY OF THE INVENTION

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

A self-configuring distributed multi-hop wireless network is described in detail in a co-pending provisional patent application (Ser. No. 60/446,617) entitled "*System for Co-ordination of Multi-Beam Transit Radio Links for a Distributed Wireless Access System*", filed in the U.S. Patent and Trademark Office on Feb. 11, 2003 and incorporated herein by reference, which enables subscribers with suitable wireless terminals to access a communications network and receive various services. A regular patent application based on the aforementioned provisional patent application (Ser. No. 60/446,617) has been filed on the same date as the present patent application, and is hereby incorporated by reference in its entirety. An example of a system described in the provisional patent application (Ser. No. 60/446,617) and the formalized version is shown in FIG. 1.

Figure 1:
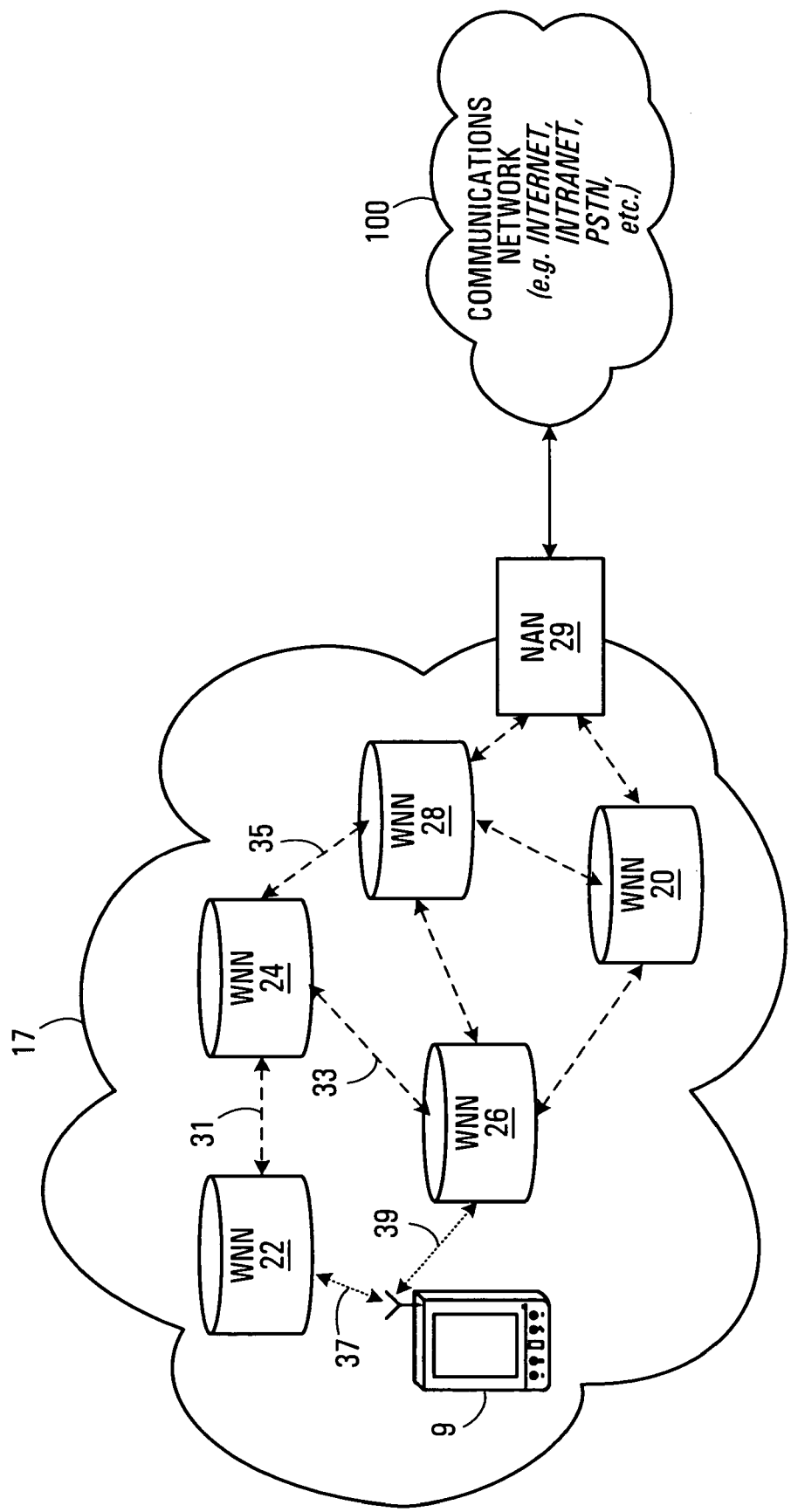
FIG. 1 is a schematic view of a self-configuring distributed multi-hop wireless network in which embodiments of the invention can be employed.

Referring to FIG. 1, the system is depicted as having a number of Wireless Network Nodes (WNN) 20,22,24,26,28 that are distributed about a region 17 (i.e. a geographic area) to be covered, from which users with mobile devices can access communication services. The system shown in FIG. 1 also includes a Network Access Node (NAN) 29 which is coupled to a communications network 100 (e.g. an internet, an intranet, PSTN, etc.).

Each of the wireless network nodes 20,22,24,26,28 and the network access node 29 includes a transit link radio (not shown in FIG. 1) that allows each of the wireless network nodes 20,22,24,26,28 to establish transit links with other wireless network nodes 20,22,24,26,28 and the network access node 29. Transit links permit traffic flow between the wireless network nodes 20,22,24,26,28 and between the wireless network nodes 20,22,24,26,28 and the network access node 29. Examples of transit links between the wireless network node 24 and wireless network nodes 22, 26 and 28 are indicated by dashed lines 31, 33 and 35, respectively. Some embodiments of the invention do not include the network access node 29 and/or the communications network 100.

It is to be emphasized that the system shown in FIG. 1 is an example only. It is to be understood that a transit link can be established between any two wireless network nodes and in practice this connection is typically only limited by the distance between nodes. Also from this example, it should be clear that a wireless network node is capable of establishing and maintaining multiple transit links simultaneously. An arbitrary number and arrangement of wireless network nodes subject to propagation constraints is contemplated.

The wireless network created by the wireless network nodes 20,22,24,26,28 and the network access node 29 provides wireless access to communication services for subscribers with suitable wireless terminals, or simple mobile devices (e.g. phones, PDA's, etc.). A wireless connection between a mobile device and a wireless network node is referred to as an access link and, accordingly, each of the wireless network nodes 20,22,24,26,28 also includes an access link radio (not shown in FIG. 1). For example, as shown in FIG. 1, a mobile device 9 has access links 37 and 39 to the wireless network nodes 22 and 26, respectively. It is to be understood that a mobile device can, under normal circumstances and depending on its location, establish an access link to any wireless network node or network access node. In practice a wireless network node may establish and maintain multiple access links with various respective mobile devices.

Moreover, in the example shown in FIG. 1, the mobile device 9 accesses the communication network 100 through a combination of at least one access link to a wireless network node and one or more transit links between wireless network nodes 20,22,24,26,28 and the network access node 29. It is also possible for traffic, originating from a mobile device in the region 17, to be forwarded between the wireless network nodes 20,22,24,26,28 in order to reach another mobile device within the region 17.

It is noted that the system is not restricted to wireless network nodes that reside in a fixed location. In alternative arrangements, a wireless network node having the functionality to establish both access and transit links, and, accordingly route traffic to and from access and transit links may be further adapted to be mobile. The wireless network nodes that are mobile are thus designated mobile wireless network nodes.

In an example application, mobile wireless network nodes are advantageously deployed on an intra-city commuter train system (or some other public transportation system) that users with suitable mobile devices use to travel to and from work. The users with suitable mobile devices of their own access communication services through these mobile wireless network nodes just as they would through the wireless network nodes that remain in a fixed location.

In other arrangements an end user mobile device is adapted to act not only as a mobile device for its owner, but also as a wireless network node from which other users with suitable mobile devices may access communication services. In such arrangements some mobile devices are equipped so as to be able to establish both access and transit communication links, and, accordingly route traffic to and from access and transit links.

In other alternative arrangements, wireless network nodes can be switched-off at one location and switched-on and discovered at another location, in which case they are considered nomadic wireless network nodes. A more generalized system can operate with an arbitrary mixture of fixed, nomadic and mobile wireless network nodes.

Figure 2A:
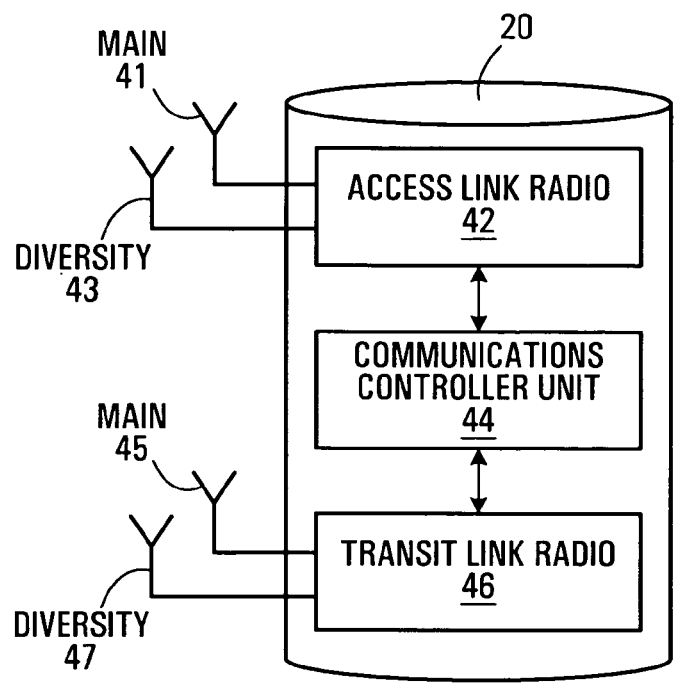
FIG. 2A is a schematic of a wireless network node used in the network of FIG. 1.

FIG. 2A shows a schematic view of the wireless network node 20 shown in FIG. 1. All of the other wireless network nodes 22,24,26,28 are substantially similar to the wireless network node 20. As was noted above, the wireless network node 20 has an access link radio 42 and a transit link radio 46. The wireless network node 20 also includes a communications controller unit 44 which is coupled to both the access link radio 42 and the transit link radio 46.

In alternative arrangements a wireless network node only has transit capabilities. Accordingly, such a wireless network node would only require at least one transit link radio. Such a wireless network node, however, could include numerous other transit link radios. Each transit link radio could be coupled to the same group of transit antennas or to separate groups of respective transit antennas. The advantage of having more than one radio would be increased capacity for the traffic on the transit links as the wireless network nodes could then communicate with more than one neighbour at once.

The access link radio is coupled to access link antennas 41 and 43, which are main and diversity antennas, respectively. Preferably the access antennas 41 and 43 are both omni-directional (i.e. non-directional) and each would have a polarization different from the other. In some embodiments the access link radio 42 would be coupled to multiple pairs of main and diversity antennas, not just two as shown in FIG. 2. Although the wireless network node 20 shown in FIG. 2A includes both a main and a diversity access link antenna, in general only one main access link antenna would be required.

More generally, access capabilities are afforded by the provision of one or more antennas that communicate with wireless terminals of a variety of different types (wireless enabled PDAs, personal computers, hybrid telephony-data terminals, and the like). The access antennas can optionally be in the form of omni-directional antennas, or an array of directional antennas arranged to provide 360 degree coverage around the wireless network node. Preferably, at least two access antennas are provided per node for diversity purposes. Alternatively, the access capabilities can be provided by one or more directional antennas, in the event it is desirable to have a more focused access coverage on a particular area.

The transit link radio is coupled to transit link antennas 45 and 47, which are main and diversity antennas, respectively. Again, although the wireless network node 20 includes both a main and a diversity transit antenna, in general only one main transit link antenna would be required. Preferably the transit antennas 45 and 47 are both directional (or "beamed") antennas and each would have a polarization orthogonal to the other. By making the transit link antennas directional, high throughput transit links are enabled between wireless network nodes. In some embodiments the transit link radio 46 is coupled to multiple pairs of main and diversity antennas. Transit link antennas are preferably directional and, thus, multiple pairs of transit link antennas would be required to provide 360-degree coverage around a wireless network node. In some embodiments this is accomplished by including six pairs of main and diversity antennas, the six pairs of main and diversity antennas projecting beams symmetrically spaced from around a wireless device.

More generally, transit capabilities are afforded by an array of directional antennas for communication that are preferably integrated with the node and provide for directional communication with other nodes or, for example, wireless back-haul. The provision of two or more directional antennas is contemplated for the directional antenna array. Preferably at least six antennas are provided to afford a sufficient degree of directional association for each antenna. The antennas of the directional array preferably are also arranged to include diversity. This may be in the form of space or polarization diversity. The use of polarization diversity has the advantage that a more compact array may be implemented.

In operation, the communications controller unit 44 handles traffic in four ways. The first way is to transfer traffic from the access link radio 42 to the transit link radio 46. The second way is to transfer traffic from the transit link radio 46 to the access link radio 42. The third way is to allow access link traffic to remain within the access link radio 42 by directing access link traffic received on one access link to another access link. The fourth allows transit link traffic to remain within the transit link radio 46 by directing transit link traffic received on one transit link to another transit link.

In order to transfer traffic from the access link radio 42 to the transit link radio 46 the communications controller unit 44 must first receive packets from the access link radio 42. Next, the communications controller unit 44 stores the packets briefly if required in a suitable memory, while determining the appropriate transit link for the packets to reach their correct destination. Similarly, the communications controller unit 44 may receive packets from the transit link radio 46 directed to a mobile unit with which the wireless network node 20 has an access link with. The communications controller unit 44 would go through a similar procedure described above except in the reverse direction to route the packets to the appropriate mobile device.

Both the access link radio 42 and the transit link radio 46 must operated according to a suitable air interface according to national and sometimes regional regulations. However, the access link radio 42 and the transit link radio 46 typically employ different frequency bands, and possibly different encoding and modulation schemes. For example, in some embodiments the access link radio 42 may use a bi-directional radio system such as defined by IEEE 802.11 standard series. Equipment for this system is widely available and is of low cost. The transit link radio 46 also preferably utilizes a bi-directional standard such as prescribed in the IEEE 802.11 standard series, but operating at a different radio frequency to avoid interference with the access link system 42.

According to a very specific example, the IEEE 802.11b/g standard prescribes operation in the 2.4 GHz radio band and the IEEE 802.11a standard prescribes operation in the radio bands between 5.15 and 5.85 GHz. Typical radio modules used for these types of radio systems are capable of operation in either the 2.4 or 5.15 and 5.85 GHz bands. Their assignment to either transit or access link functions is determined by software control and configuration of the communications controller unit 44.

In one particular embodiment, the access link radio 42 is an IEEE 802.11b/g module operating at 2.4 GHz, and the transit link radio 46 is an IEEE 802.11a module operating in the 5.15 and/or 5.85 GHz bands.

It is to be appreciated, however, that the present invention is applicable to other sets of frequencies for one or both the access and transit functions and to other radio system standards, such as IEEE 802.16a. In general a wireless device (e.g. a wireless network node or a mobile unit or a wireless repeater, adapted to coincide with an embodiment of the invention) could use other sets of frequencies for one or both of the access and transit aspects of operation. Other radio system standards such as IEEE 802.16a, the ETSI standard for HIPERLAN 2 (ETSI TS 101-475), or DECT (ETSI TS 300-175), the digital video broadcast standard (ETSI EN 300-744) and the various cellular radio standards GSM, CDMA (IS-95), TDMA (IS-136), UMTS etc.

In view of the aforementioned the term wireless network node as used in conjunction with the description of the present invention contemplates a component having co-located access and transit functionality. However, a wireless network node may also be configured to have only transit functionality in which case such a wireless network node would serve as a wireless repeater in a wireless network. A wireless repeater embodiment would require at least two transit radios despite having only transit capabilities.

With reference to the system shown in FIG. 1, some of the wireless network nodes 20,22,24,26,28 may be located outdoors to provide access coverage for streets and parks. Simultaneously, some of the other wireless networks nodes 20,22, 24,26,28 may be located indoors to provide access coverage for hotel lobbies, airport terminals or commercial buildings. Depending upon the location (or type of location) of a particular wireless network node, the wireless network node may have to operate in accordance with a different set of radio system operation parameters than its neighbouring wireless network nodes, which may be in a different type of location. In the United States, for example, the FCC part 15 regulations provide for operation in different radio frequency channels and with different power levels for the indoor and outdoor located wireless network nodes. Other jurisdictions also have a variety of rules for radio (i.e. wireless) systems in different types of locations.

In some instances, in order to permit more flexibility, wireless network nodes are designed and manufactured to be operable in a number of environments (e.g. indoor or outdoor). These wireless network nodes still require a final manual configuration during (or after) installation and prior to use. Often, for example, in order to perform the final manual configuration, a technician will have to record the serial numbers and the locations of wireless network nodes. The wireless network nodes are then configured later using network connections and suitable maintenance software controls. In a distributed multi-hop wireless access network, however, a wireless network node may not have a connection to the network unless a number of other wireless network nodes are also operating. Thus, the configuration may have to be performed by a technician during the installation as there may be no network connection from which to receive configuration information. This requires the technician to have special tools for configuring the wireless network nodes. Moreover, this complex manual configuration takes additional time and adds expense to the deployment of a wireless network. If a wireless network node is later moved it must again be manually re-configured.

The final manual configuration could also be set during the installation by the provision of a switch—built into the wireless network nodes—to select the appropriate environment. Unfortunately, the switch would need to be a weatherproof device if it is to be externally accessible on a wireless network node. Such switches are both expensive and introduce reliability issues. There is also the possibility that the switch may be altered—either intentionally or unintentionally—after installation.

Alternatively, a switch could be mounted on the inside of a wireless network node package. However, this location would require a technician to open the wireless network node package to set/reset the switch or check the configuration later. Opening the wireless network node package is generally undesirable as it may spoil the weather proofing seal of the package and permit the entry of foreign material and/or moisture.

It is also not generally reliable for a new wireless network node to "listen" for/to information transmitted by any neighbouring wireless network nodes and so learn from them, as the neighbours may be outdoors and the new wireless network node indoors (or vice versa). Also, the new wireless network node may be within a restricted area while its neighbours are not (or vice versa). Listening to neighbouring wireless network nodes may result in a homogeneous network in which all of the nodes undesirably end-up operating according to the same set of radio system operation parameters. According to some embodiments of the invention, it is preferable to have wireless network nodes each independently determine its own radio system operation parameters.

In a self-deploying wireless access network using a multiplicity of radio spectrum assignments, it is desirable to know whether a wireless device is located within one type of location or another.

For example, it would be desirable for a wireless network node or mobile unit to determine whether or not it is located either inside a building or outside a building, as different regulations may apply for indoor and outdoor use. According to such regulations, the permitted operating frequencies and power levels may be different for indoor and outdoor use.

According to another example, it may be desirable for a wireless device to determine the type of building that the wireless device is located within. Hospitals and airports sometimes have more restrictive regulations concerning the operation of wireless devices than do commercial buildings and shopping malls.

In yet another example, it would be desirable for a wireless device to determine its proximity to locations occupied by people. Being inside a building is one indication that people may be nearby. Being outdoors in a wide open environment suggests that people are likely not nearby. In areas where people may be nearby, the wireless device may need to use a lower power to ensure the RF limits for human exposure are met.

Thus, in general, it would be advantageous if a wireless device could determine, without assistance from another device, foreign signal or a person, the type of location that the wireless device is located within so that it can automatically adjust its operating state (i.e. appropriately select radio system operation parameters). This would avoid the need for manual configuration of a wireless device, re-configuration later if the wireless device is re-located (or is mobile) and the need for pilot signals.

In some embodiments of the invention two or more radio units of a wireless device are used to measure or detect clues about the radio propagation environment and the type of space that surrounds a wireless device. For example, the clues for an indoor environment are that the surroundings (of a wireless device) are usually more crowded and hence the reflected radio waves will have a shorter delay spread and movements of objects or people (as indicated by a measured Doppler shift) indoors are usually substantially slower than those for outdoors. From various measurements, the wireless device may determine the type of location that it is located within, whether that is simply a determination between inside and outside or a more complex determination of the type of building or space that the wireless device is located within. In either case, this determination can be used to automatically change/adjust the radio system operation parameters the wireless device operates in accordance with. With the type of location determined, a wireless device may then automatically select the appropriate radio system operation parameters for the type of location that it is in and the corresponding regulations that apply.

In some embodiments, self-determination of the type of location may reduce the need for manual configuration of a wireless device which in turn may reduce both the installation time and cost of deployment. The automatic self-determination of the wireless device's environment may also reduce any prior dependence on special non-volatile memory in a wireless device necessary to save location information.

The automatic self-determination of a wireless network node's location, provided by some embodiments of the invention, may substantially reduce the amount of time dedicated to manual configuration of a wireless device during deployment or re-deployment. It is further emphasized that, embodiments of the present invention could be applied to a variety of wireless devices such as cell-phones, hand-sets, Personal Digital Assistants (PDA's), cellular base-stations, etc.

Figure 2B:
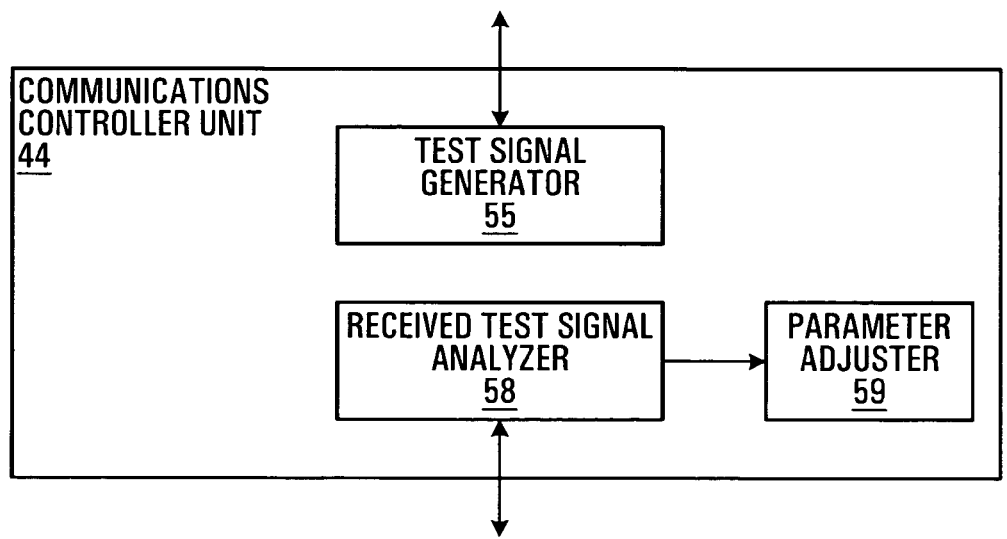
FIG. 2B is a schematic of a communications controller unit, shown in FIG. 2A, modified to include location determining functionality in accordance with an embodiment of the invention.

According to an embodiment of the invention, each wireless network node is equipped with functionality which allows it to differentiate between its location being indoors or outdoors. FIG. 2B shows the communications controller unit 44 of FIG. 2A modified to include this additional functionality. The communications controller unit 44 also includes a test signal generator 55, a received test signal analyzer 58, and a parameter adjuster 59 for adjusting radio system operation parameters based on the results of an analysis performed by the received test signal analyzer 58. The functions of the additional elements to the communications controller unit 44 will all be described in detail below.

In some embodiments, the functions of the additional elements of the communications controller unit 44 may be implemented as software. Alternatively, the functions could be implemented using additional hardware units within the communications controller unit 44. More generally, any combination of hardware and/or software and/or firmware may be used to implement these functions, either within the communications controller unit 44, or separate from the communications controller unit 44. While three functional units are illustrated, it is to be understood that they may be implemented as a single piece of software or hardware, or as combinations of multiple such components. Furthermore, it might also be appropriate to include one or more of these functions in the access link radio 42 and/or the transit link radio 46.

In alternative arrangements the access link radio 42 and/or the transit link radio 46 may be supplemented by additional functionality to enable each to test and analyze the environment. Some of the elements discussed further below (e.g. a RAKE receiver and equalisers) are typically already included in modern radio modules. In some embodiments internal signals from such elements are analyzed further in either radio or externally for indications that provide clues to the environment around a wireless device.

According to some embodiments of the invention, components of a distributed multi-hop wireless access networks are modified and/or added to enable self-deployment with a reduction in the amount of manual input required for the configuration of the wireless network nodes. In some embodiments, wireless network nodes (and wireless devices in general) are modified to self-determine the type of location they are in during operation and to select suitable radio system operation parameters without manual configuration.

Any number of wireless devices could be adapted according to embodiments of the invention. For example, wireless network nodes, mobile devices (e.g. phones and PDA's), cellular base stations, other types of fixed transmission devices, robots and vehicles (automobiles, boats, trains, aeroplanes, etc.) could all be adapted according to embodiments of the invention in order to adapt their communications services and links.

In the case of the cellular standards, cellular base stations are now often installed indoors or in close proximity to places that may be occupied by people. Thus, it may be desirable to equip a cellular base station to automatically detect whether or not it is in a space that places it in close proximity to people so it can use the appropriate power levels so as to meet the human exposure limits for radio radiation.

An embodiment of the invention will now be described with reference to a flow-chart provided in FIG. 3, which might, for example, be implemented in a wireless device such as the wireless network node 20 of FIG. 2A equipped with the communications controller unit 44 of FIG. 2B. More generally, the invention is applicable in any wireless device equipped with two radio systems, and which would benefit from being able to make this location determination. More generally still, in one general scenario all that is required for one embodiment is a first antenna (or pair of antennas) capable of transmitting test signals as detailed below, and a second antenna (or pair of antennas) capable of receiving the test signals.

Figure 3:
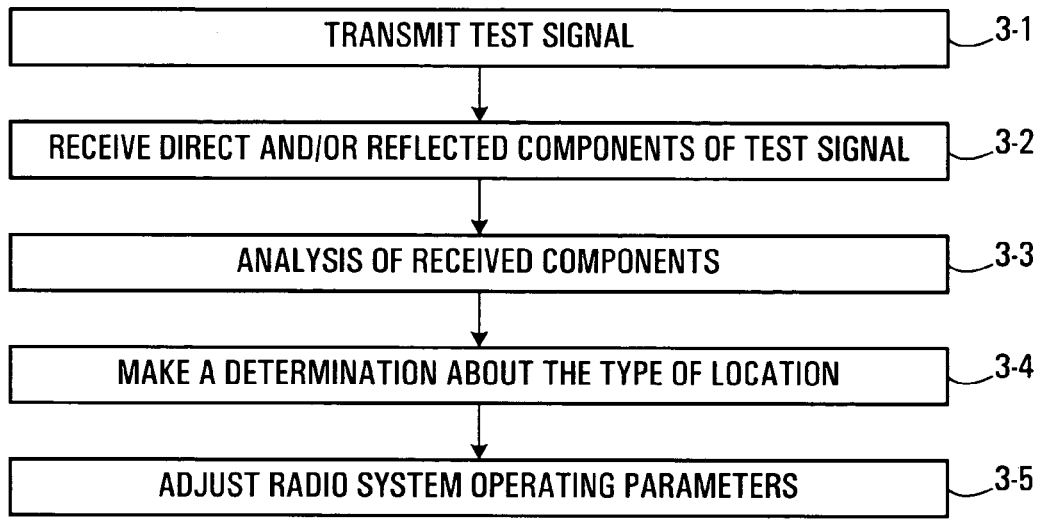
FIG. 3 is a flow chart illustrating a method according to an embodiment of the invention.

Preferably, the method detailed in FIG. 3 is initiated automatically upon power-up of a wireless device. In some embodiments this method will facilitate the automatic deployment of networks featuring such wireless devices in that as soon as each wireless device is installed and turned on it will self-identify location and operate accordingly. In some embodiments this method is employed periodically after the power-up of a mobile device in order to determine if there have been any changes or required corrections due to the availability of more clues and/or measurements. This might help later resolve an ambiguous initial result that was arrived at immediately after power-up, resulting from a fast measurement and analysis of the environment done to bring the wireless device online quickly. In such cases, measurements can be taken after the initial determination in the event that it is known that a fast measurement and analysis cycle is prone to error.

As some embodiments of the invention are integrated into mobile wireless devices and due to the inherent mobility of a mobile wireless device it is likely that the radio propagation environment surrounding the mobile wireless device will change in relation to changes in location. It is thus advantageous for the method to be carried out periodically (e.g. every few minutes).

The first step 3-1 is the transmission of test signals from the access link radio 42, or more generally from a first radio system in a wireless device. The second step 3-2 is the reception of direct and/or reflected components of the test signals by the transit link radio 46, or more generally by a second radio system in a wireless device. The third step 3-3 is the analysis of the received signals by the communications controller unit 44 to determine the radio signal propagation characteristics of the environment surrounding the wireless network node 20.

With further reference to FIG. 2B, the test signal generator 55 generates test signals (i.e. test packets). The test signal generator is located within the communications controller unit 44. In alternative embodiments the test signal generator 55 is integrated into either one of the access link radio 42 or the transit link radio 46. However, the operation of the test signal generator would remain under the control of the communications controller unit 44.

In such embodiments the communications controller unit 44 may provide one of the access or transit radios with a test signal pattern to be generated and used. For example, to help determine the propagation delay, a delay pattern that has a strong autocorrelation is used. A "Barker code" is one possible example of such a code. The communications controller unit 44 could arrange for the Barker code to be sent in the payload of test packets. Those skilled in the art will appreciate that a standard radio will typically apply techniques of scrambling, coding and interleaving also (in the case of OFDM, sub-carrier selection) to each bit of the test packets in accordance with a known standard. The communications controller unit 44 would need to "pre-code" the test signal pattern so that the desired signal after selection, scrambling, coding and interleaving is transmitted.

The received test signal analyzer 58 performs the analysis of received signals received by the transit link radio 46. The received signals are composite signals made up of direct and/or reflected signal components of the transmitted test packets. The direct signal component is the part of the received composite signal that goes straight from the transmitter (e.g. access) to receiver (e.g. transit) antennas without much interaction with the environment. Useful information can be gathered from the direct signal component as it is the first to arrive at a receiver and provides references in time and signal form for the later received signal components (i.e. the reflected signal components). In some embodiments, further signal processing needed to learn about the surrounding environment involves separating the direct and reflected signal components, something that is done for example in CDMA receivers. Accordingly, a receiver will receive a composite signal and then may sort out which are direct and which are the reflected signal components as a part of the analysis process.

Referring again to FIG. 3, the fourth step 3-4 is the determination of the environment as indoors or outdoors based on the results of the analysis at step 3-3. In some embodiments, this involves making a comparison of the radio signal propagation characteristics determined in step 3-3 with selected criteria. Detailed examples of such criteria are provided below. With respect to FIG. 2B, this capability is integrated into the received test signal analyzer 58.

More generally, in a wireless device location self-determination can be accomplished by a system for determining the type of location in which the wireless device is located, and in some embodiments the determination is specifically a determination of whether or not a wireless device is inside or outside.

The fifth step 3-5 is an adjustment and use by the wireless device of radio system operation parameters appropriate based on the determination made at step 3-4. In the very specific embodiment of FIG. 2B, step 3-5 is carried out in the parameter adjuster 59. It is noted that making this adjustment can be as simple as setting a flag in software to indicate whether a wireless device is indoors or outdoors, and then the remainder of the operation of the wireless device proceeding in accordance with this flag.

Each of these five steps is discussed in detail below with further reference to FIGS. 4 and 5. In other embodiments these approaches are used to determine the location of a wireless node. In further embodiments, this information is then used to adjust the operation of the wireless node as described above.

With further reference to FIG. 2A, in a specific embodiment, access link functionality is implemented using a first air interface, such as the IEEE 802.11b which prescribes operation in the 2.4 GHz radio band, and the transit link functionality is implemented using a second air interface, such as the IEEE 802.11a standard which prescribes operation in the radio bands between 5.15 and 5.85 GHz. These two different air interfaces are employed such that there is reduced interference between the access link radio 42 and the transit link radio 46. In such embodiments, it may be necessary to adjust the operation of one or the other of the access link radio 42 and transit link radio 46 so that the transmissions by the access link radio 42 can be detected on the transit link radio 46. For example, in one embodiment, each of the radios is capable of operating in accordance with both standards, and a first step in determining location is to configure the two radios to be operating using the same standard. Once location has been determined, the two radios (or which ever of the two needing to be re-configured) are re-configured to their normal operating state.

Figure 4:
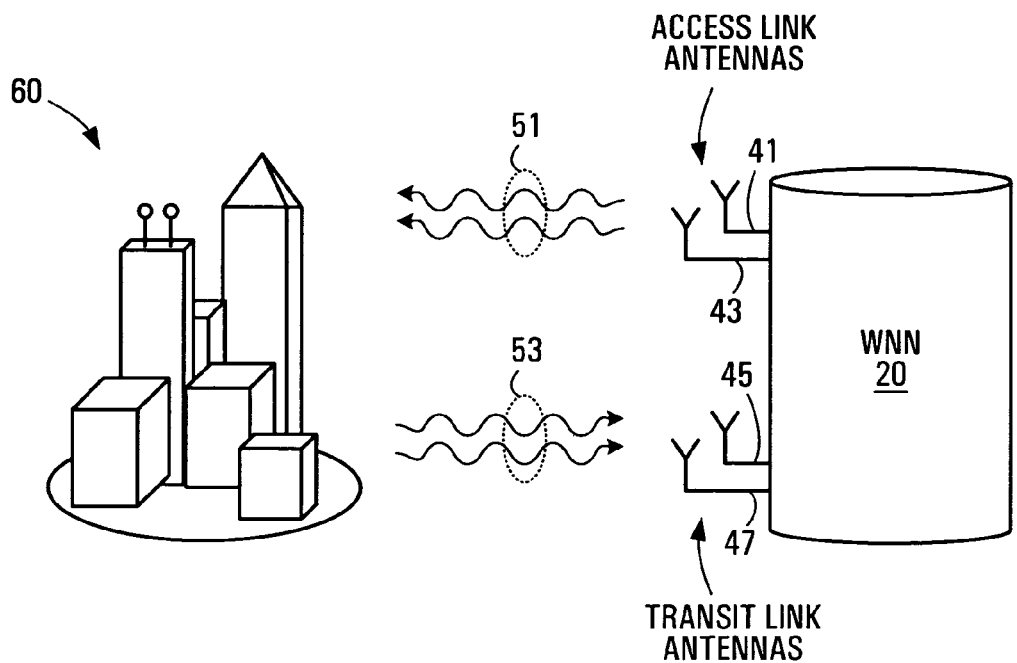
FIG. 4 is an illustration depicting the wireless network node shown in FIGS. 2A and 2B in operation in accordance with aspects of the invention.
Figure 5:
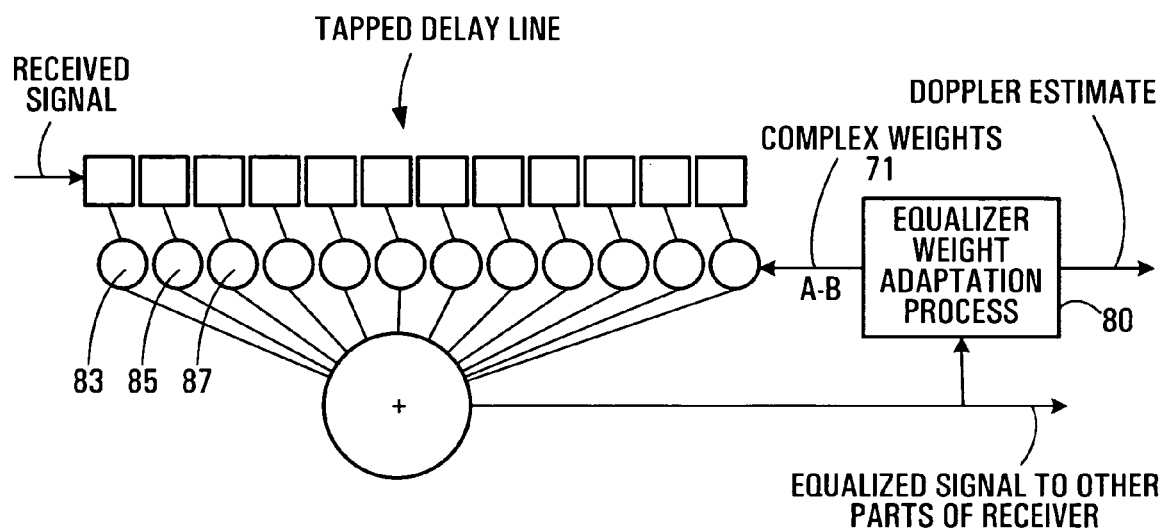
FIG. 5 is a schematic of a system for estimating a Doppler profile from a received signal.

FIG. 4 is an illustration depicting the operation of the wireless network node 20 shown in FIG. 2A in operation according to aspects of the invention. With further reference to FIG. 2A, as described above, the wireless network node 20 has the access link radio 42 and the transit link radio 46. The wireless network node 20 may use either link radio system (42 or 46) to transmit a test signal or sequence of test signals that is received and measured by the other link radio system (46 or 42, respectively).

As shown in FIG. 4 the access link radio 42 (not shown) transmits test signals 51 (e.g. test packets) into the environment 60 surrounding the wireless network node 20 using the access link antennas 41 and 43. In general, it is preferable to use an access link radio equipped with omni-directional antennas to transmit test signals/packets. Direct and/or reflected components 53 of the test signals/packets may be received by the (directional) transit link antennas. However, the principles and teachings of the present invention are applicable to the use of the transit link radio 46 to originate the test signals. For example, in some embodiments transit link antennas are omni-directional and, thus, would be well suited to transmit test signals/packets.

Radio regulations for the bands generally include some overlap in terms of the prescribed types of locations in which transmissions are permitted within each. For example, in the United States, the FCC part 15 rules for 5 GHz operation allow the use of the outdoor bands indoors, while the use of the indoor band is forbidden outdoors. Thus, a wireless device may initially transmit test signals using the outdoor bands to sense the environment to determine if it is located indoors and so allowed to switch to the use of the indoor bands and radio system operation parameters. The 2.4 GHz band may be used anywhere, and so test signals may be transmitted on the 2.4 GHz band in order to determine the location of a wireless device and in turn the applicability of the 5 GHz rules.

A transmitted test signal may simply be a packet that is self-addressed to the wireless device that transmits it. To that end, the IEEE 802.11 standard series prescribes a burst signal format that includes known elements, such as preambles and training sequences, that can be measured by a receiver to determine a wireless device's radio propagation environment. The purpose of transmitting test signals is to probe the environment within a range around a wireless device. Test packets may be transmitted at reduced power to avoid saturating the radio front end of receiver(s) co-located with the transmitting device. In some embodiments, a series of subsequent test packet transmissions is made at consecutively increasing powers so as to probe deeper into the environment and so gain a vision of the features at increasing distance from the node.

Referring to FIG. 4, transmitted test signals/packets are received and measured by the transit link radio 46 using the transit link antennas 45 and 47. The transit link radio "listens" for the test packets addressed to the wireless network node 20 and makes measurements during the preamble and training sequences of the packet burst as well as during the packet information fields. Specific test signal structures have been proposed above. More generally, any test signal can be employed which allows the wireless device to make an analysis of received direct and/or reflected components so as to make a decision about location.

In general (without specific reference to the Figures), this reception and measurement is done using all of the wireless network node's transit link beamed (directional) antennas in order to permit sensing the environment in all directions. Thus, a series of test transmissions can be made by an access link radio and these are received by a transit link radio by switching through each of a number of transit antennas in sequence. The received signals will be a combination of the energy coupled directly between the access link antennas and the transit link antennas and signals reflected from features (e.g. buildings, walls, vehicles, furniture, people, pets, wild animals etc.) in the environment surrounding a wireless device. The nature and time offset of reception of these reflected signals is indicative of the environment.

As a very specific example, the larger the time-delay of a received reflected signal, the further distance away the object is from a wireless device. By stepping through its (directional) transit link antennas, the wireless device may thus sense the direction and distance to objects in its environment.

To sense the environment, the received signals can be measured for at least one of delay spread, attenuation profile, polarization mixing and Doppler shift. Other radio signal propagation characteristics may also be used. One or more radio propagation characteristics can be measured per test transmission packet received back from the environment. It is preferable for a series of test packets to be measured with each combination of antenna and polarization.

In some embodiments a wireless device is enabled to measure a series of packets for each radio signal propagation characteristic in order to obtain a multiplicity of samples of the measures and hence be able to determine a statistical average measurement.

Delay spread indicates the distance to the reflecting surfaces in the environment surrounding a wireless device. Delay spread (i.e. the timing of the arrival of the various reflected components of the received signal with respect to a primary (or first to arrive) component) may, for example, be detected by a RAKE receiver commonly used in CDMA receivers or an equaliser used in other radio systems. Similarly, the amplitude spread (i.e. the decay in amplitude across the various delayed components) may also be detected using the RAKE receiver or equaliser.

As the speed of the radio signals is about 30 centimeters per nanosecond, a received component delayed by 100 nanoseconds indicates that an object is about 30 meters away. Larger delays thus indicate that the node is located in wide open space, that are likely outdoors. However, it is likely that even an outdoor mounted wireless network node will be close to a wall in one direction and be close to nearby building in other directions. Thus, the presence of close objects is not a guarantee of being located indoors.

In the event that features in the environment are so close to the wireless device that reflections of a test packet begin to arrive before the test packet is fully transmitted, a wireless device may still be able to extract the reflections from the composite received signal. This can be done by keeping the receiver's amplifier in its linear region so that the amplifier does not distort the incoming composite signal. Thereafter it is possible to employ additional signal processing to subtract a copy of the transmitted signal from the received signal and so make the delayed (reflected) signal returned/received from the environment easier to detect and analyse.

The amplitude distribution with time can be used to determine the slope of the radio signal propagation decay with distance. A distribution with a steep slope and a sharp cut-off or a dual slope (i.e. much weaker components beyond a threshold delay) is indicative of an environment with nearby walls typical of indoor locations. A lesser single slope with longer delays is indicative of an outdoor open environment.

Polarization mixing may be measured by sending a sequence of test signals/packets from each of two polarizations of an access link radio. These are detected in turn by the transit link antennas. The measure of polarization mixing may be determined as the ratio of signal strengths received on co-polar and cross-polar antennas.

For example, if there are two polarization antennas for both the transmitter and the receiver there is a possible sequence of four different transmissions that can be sent in any arbitrary order. The first is to transmit on a first polarization and receive on the first polarization ("co-polar"). Similarly, the second is to transmit on a second polarization and receive on the second polarization (also "co-polar"). The third is to transmit on the first polarization and receive on the second polarization ("cross-polar"); and, the forth is to transmit on the second polarization and receive on the first polarization (also "cross-polar"). The ratio of measurements of the first to the third and the second to the fourth provide measures of polarization mixing from the first to the second and second to the first polarizations. Typically, the two ratios would be similar, but a substantial difference between the two would be indicative of a very cluttered environment and a suggestion that the wireless device is indoors.

Doppler shift of a received signal may be measured as the rate of change of the phases of the tap weights in an equaliser in a receiver. This technique, known in the art, is illustrated generally in FIG. 5. Complex equaliser weights 71 are determined by the equaliser adaptation process 80. The rate of change of the phase of each of the tap weights (only three tap weights are marked by example at 83,85,87) represents the Doppler shift of a received component. The received component with the maximum rate of change thus indicates the rate of motion of the fastest moving reflective surface in the environment around a wireless device. The Doppler shift of the strongest amplitude tap also represents the motion of the dominant reflective surface in the environment surrounding the wireless device.

The Doppler shift of the received signals is indicative of the motion of the objects in the environment. A high Doppler shift indicates rapid motion of the objects, this is indicative of an outdoor environment. As an example, a Doppler shift of 18 Hz suggests a motion speed of about 10 km/hr. This considerably exceeds walking speed and, thus it is indicative of an outdoor environment. A Doppler shift of less than 5 Hz would be indicative of an indoor environment or an outdoor environment with no vehicular traffic.

A combination of one or more of the aforementioned measurements is made by a receiver preferably for a sequence of test transmission packets and preferably for combinations of antennas and polarizations. The resulting suite/collection of measurements is then made available to a decision process. That is, multiple measures can be considered to define a multi-dimensional space and the decision threshold between indoor and outdoor is a multi-dimensional surface in that space. As the decision thresholds for each measure are not typically sharply defined, the multi-dimensional surface has a thickness and the decision is ambiguous within the thickness of the surface.

The decision process determines the environment by considering a suite/collection of measurements of the received signals. Unfortunately, none of the measurements uniquely determines the environment in all cases. It may be necessary to use a combination of measurements and some of their statistical properties to determine the environment. In some cases the measurements may be ambiguous, in which case a wireless device must adopt radio system operation parameters for the most restrictive set of regulations to establish its links to a communications network.

As an example, a wireless network node may be located near a window in a building and hence it may sense an environment that has many aspects of both indoors and outdoors. Alternatively, in some cases windows are opaque to radio signals (e.g. due to various coatings to prevent heat loss or UV blocking). Thus, a wireless device according to an embodiment of the invention may not be able to detect signals from the other side of the glass regardless of whether it is outside or inside on the other side of the glass. Additional manual configuration may be used in these instances to re-select the environment if need be.

The appropriate radio operating parameters may be selected, based on the determined environment, from a table (or list) provided in a communications controller included in the wireless device. The communications controller can be generalised to be any system for changing the operations of the wireless device based on the type of location the wireless device is located within. This table (or list) would include the permitted radio channels, power levels, applicable protocols, deference thresholds, modulation formats (etc.) that are needed for operation in the environment.

In the event that the determination is ambiguous the communications controller will select the parameters for the most restrictive set. This may likely be the same as the parameters used for test transmissions. In the United States, the FCC rules part 15 allow the use of the 5.25-5.35 GHz and 5.75-5.85 GHz outdoor frequency bands also indoors and so an ambiguous determination in this case is the same as an outdoor determination.

The decision process may be further clarified by defining a threshold region for each parameter and deciding indoor or outdoor only if all or the majority of the measures are in a respective region. Table 1 given below provides an example.

TABLE 1

Thresholds for Various Parameters

| Measure | Indoor | Ambiguous | Outdoor |
|---|---|---|---|
| Delay Distance | <10 meters | | >20 meters |
| Amplitude Slope | >3.5 | | <3 |
| Dual slope | Identifiable | Tough call | None |
| Polarization Mix Ratio | <2 db | | >10 dB |
| Doppler Shift | <5 km/hr | | >10 km/hr |

Determining the location of the node may be accomplished by making measurements for each direction of the transit link beams and mapping the measurements for each direction on a table such as the one described above. If the measures in all the directions indicate a clear choice, that is the environment. If, as is quite likely, there are conflicts among the directions, some directions, such as those facing the wall the node might be mounted on should be excluded. Measures for a direction that has only a very large close main delay component (indicating a nearby large surface) and a low polarization mixing may be excluded. The determination of the location should then be made on the consensus of the remaining measures. The consensus may be definitive or it may be ambiguous as illustrated in Table 1.

In other embodiments a wireless device includes other types of sensing devices, such as a microphone, digital camera, thermometer, barometer, wind vain, and radar detector. These devices could also be used to collect information about the radio propagation environment surrounding the wireless device. Additionally these sensors could also be used for other types of surveillance. The wireless back haul provided by the transit links is attractive for collecting information across a wide geographic area.

If there is a microphone associated with a wireless device (internally or externally connected with a cable), then the microphone could listen to the sounds for clues to the environment. In typical installations one would expect to hear mainly traffic noises in an outdoor location and mainly speech in an indoor location. Some significant signal processing would be required to make this distinction. This is still only a clue, one might detect speech outdoors and traffic can often be heard indoors. The noise will also depend on the time of day. For example, there is noticeably less traffic late at night in some areas. Thus, passive sensing would not seem to be too helpful. It might be possible to distinguish a hospital (a quiet site) from an airport (a noisy site) but perhaps a hospital that is near an airport would be confusing.

One useful application of a microphone in a mobile device, such as a mobile telephone, would be to sense the sound of speech in the environment of the phone and not sound the ringer announcing a call arrival if there is speech (and hence there should not be an interruption).

In another embodiment, a microphone is coupled with a transmitter. In this configuration, like the two radios, test signals can be sent to probe the environment. Such signals could help determine the distances to nearby objects and so assess if there are nearby walls. These would be additional clues to the operating space that could be used in conjunction to the radio measurements.

In other alternative embodiments an audio proximity sensor is used for another purpose within a wireless device (like the proximity sensors often used to help trucks back into loading bays). Such an audio proximity sensor helps a wireless device determine if one of its antennas was facing a wall and hence should be excluded from the normal WNN operation due to the blockage. Such a determination could also be made with the radio measurements by looking for similar delay return patterns in antennas on opposite faces and hence noting that one profile is the same as the other seen in reflection from the nearby wall. The one facing the wall will have the lower strength due to reflective loss.

There are a number of applications for embodiments of the invention that have been contemplated.

For example, in addition to the choice of operating rules and channel assignments mentioned in the main part of the above description, some radio system standards do define different radio modulation modes for different environments. The Digital Video Broadcast (terrestrial) standard mentioned earlier (ETSI EN 300-744) is one example that provides a different number of sub-carriers for its orthogonal frequency division modulation (OFDM) to adapt to different environments. A reduced number of sub-carriers is defined for use in environments with low dispersion (low clutter), generally outdoors. A larger number is defined for cluttered environments such as urban streets and indoor locations. Alternative embodiments of the invention may be used in combination with such DVB base stations to determine the environment and automatically select the appropriate DVB operating mode.

It was also noted above that embodiments of the invention can detect the presence of a wall blocking one or more of a wireless network node's antennas. The blocking wall would impede transmissions in one direction although signals may be detected due to reflections from the blocking wall. By detecting the presence of the wall, the wireless network node operation may be adjusted to exclude the blocked antenna from operation. Doing this may improve the efficiency of the wireless network node as it will have fewer signals to process.

It was also noted above, some embodiments of the invention include examination of receiver equaliser patterns derived from the composite received signals in equalisers included in the wireless network nodes (or generally wireless devices). The receiver equaliser patterns represent the distortion of the transmitted signal by the surrounding environment and will be similar (although not identical) to the distortion seen by other wireless devices in the coverage area receiving signals from the wireless network node. Using the knowledge of the distortion as seen by other wireless devices, the wireless network node can act to pre-distort its transmitted signals to partially compensate for the distortion caused by the surrounding environment. Such pre-distortion would only be an approximation, but would still be an advantage for communication between the wireless network node and other wireless devices in its coverage area.

It was noted above in the discussion relating to the description of FIG. 3 that in one general scenario all that is required for one embodiment is a first antenna (or pair of antennas) capable of transmitting test signals as detailed below, and a second antenna (or pair of antennas) capable of receiving the test signals. Alternatively, embodiments of the invention could be integrated into a wireless device with a single antenna. This is more difficult technically as the transmitted and received signals are harder to distinguish. At some frequencies, devices known as directional couplers allow a transmitter and a receiver to be isolated to permit simultaneous transmission and reception, respectively. These, or similar devices, would permit the use of the invention with a single antenna.

Whether this is practical or not would depend on cost and available space. If compact packaging size is desired, then a single antenna with coupler would be a preferable choice despite a likely higher cost. If there is space for two (or more) antennas, then this may be less expensive than a single antenna with a coupler.

What has been described is merely illustrative of the application of the principles of the invention. Other arrangements and methods can be implemented by those skilled in the art without departing from the spirit and scope of the present invention.

We claim:

1. A wireless device comprising:
   a first antenna and a second antenna;
   a system for determining whether or not the wireless device is either inside a building or outside a building; and
   a parameter adjuster for changing the operation of the wireless device based on whether or not the wireless device is either inside a building or outside a building; wherein, upon determining that the wireless device is inside a building, the parameter adjuster switches the wireless device to a first set of radio system operation parameters; and upon determining that the wireless device is outside a building, the parameter adjuster switches to a second set of radio system operation parameters.

2. The wireless device of claim 1 in the form of a mobile wireless device capable of accessing a wireless network.

3. The wireless device of claim 1 in the form of a wireless access node for providing wireless access to wireless mobile devices and also communicating with other wireless access nodes.

4. The wireless device of claim 1, wherein the parameter adjuster switches the wireless device to a third set of radio system operation parameters upon failing to adequately determine whether or not the wireless device is either inside or outside a building.

5. The wireless device of claim 1, wherein the parameter adjuster switches the wireless device to a more restrictive one of the first and second set of radio system operation parameters upon failing to adequately determine whether or not the wireless device is either inside or outside a building.

6. The wireless device of claim 1, further comprising first and second radio modules to which the respective first and second antennas are coupled.

7. The wireless device of claim 6 wherein the first antenna is a transit link antenna and the second antenna is an access link antenna, and the first radio module is a transit link radio and the second radio module is an access link radio.

8. The wireless device of claim 6 operable to, prior to making a location determination, configure the first and second radio modules to operate with a common air interface.

9. The wireless device of claim 8 wherein the first radio module operates nominally according to 802.11a, the second radio module operates nominally according to 802.11b, and wherein configuring the first and second radio modules to operate with a common air interface comprises configuring them both to operate according to only one of 802.11a and 802.11b.

10. The wireless device of claim 1, wherein the parameter adjuster operates automatically in response to a determination of whether or not the wireless device is either inside a building or outside a building.

11. The wireless device of claim 1 wherein the system for determining whether or not the wireless device is either inside a building or outside a building executes automatically upon power-up of the wireless device.

12. A wireless device comprising:
    a first antenna and a second antenna;
    a system for determining whether or not the wireless device is either inside a building or outside a building;
    a test signal generator operable to transmit a test signal from the first antenna into the environment surrounding the wireless device; and
    a received test signal analyzer operable to analyze direct and/or reflected components of the test signal from the environment surrounding the wireless device through the second antenna so as to derive at least one radio signal propagation characteristic for use in determining whether or not the wireless device is either inside a building or outside a building.

13. The wireless device of claim 12, wherein each at least one radio signal propagation characteristic is selected from a group consisting of delay spread, delay speed, delay distance, attenuation profile, amplitude slope, polarization, and Doppler shift.

* * * * *